(No Model.)
L. C. BARTLEY.
GRAVITY BATTERY.
No. 393,203.  Patented Nov. 20, 1888.
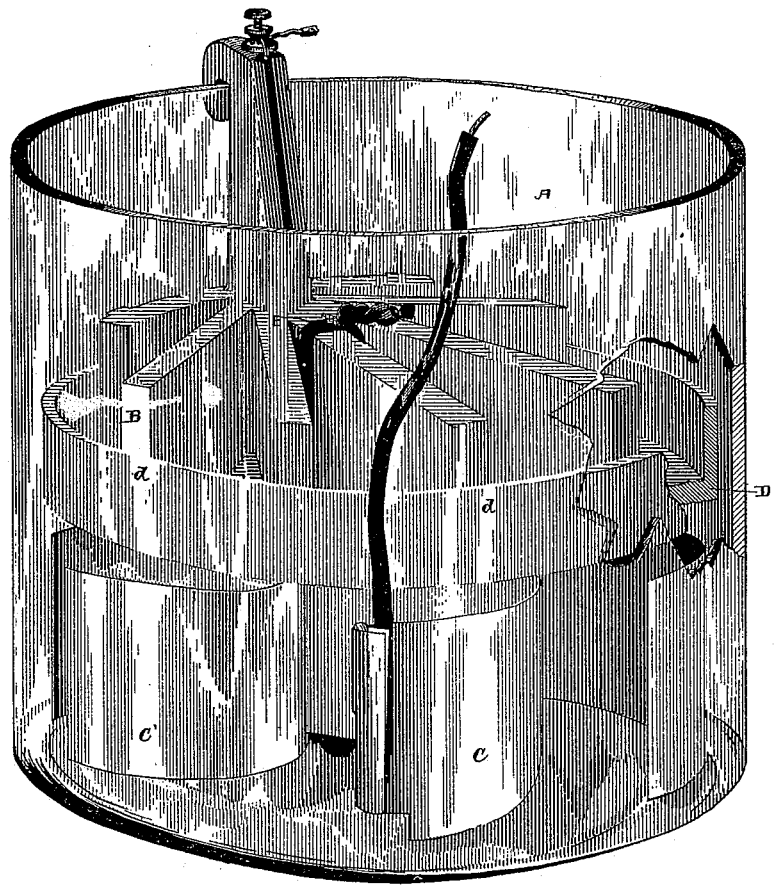

UNITED STATES PATENT OFFICE.

LEON C. BARTLEY, OF CAMBRIDGE, OHIO, ASSIGNOR OF TWO-THIRDS TO WILLIAM QUINN AND A. T. WIKOFF, OF SAME PLACE.

GRAVITY BATTERY.

SPECIFICATION forming part of Letters Patent No. 393,203, dated November 20, 1888.

Application filed May 31, 1888. Serial No. 275,600. (No model.)

*To all whom it may concern:*

Be it known that I, LEON C. BARTLEY, of Cambridge, in the county of Guernsey and State of Ohio, have invented certain new and useful Improvements in Gravity Batteries; and I do hereby declare the following to be a full, clear, and exact description of the invention, such as will enable others skilled in the art to which it pertains to make and use the same.

My invention relates to improvements in gravity electric batteries, in which a receptacle is suspended under the zinc element to receive the oxide of zinc, to prevent the latter from falling below and uniting with the blue vitriol, copper, and glass jar, to the end that much labor and material are saved in cleaning and renewing the battery. Heretofore with gravity batteries the zinc oxide was allowed to fall below, where it adhered so firmly to the copper and to the blue vitriol and to the glass jar that it was extremely difficult to remove the oxide. The copper and blue vitriol, so far as they became incrusted with the zinc oxide, were rendered inoperative, and the result was that the battery had to be cleaned and renewed usually about once a week. It was so difficult to remove the zinc oxide and blue vitriol that cemented together on the glass jar that the latter was frequently broken in the cleaning operation. It was found entirely impracticable to separate the zinc oxide from the blue vitriol to which it adhered, and consequently such blue vitriol was thrown away.

I have discovered that by suspending a receptacle under the zinc element to catch the oxide of zinc from the latter the battery will remain operative eight or ten times as long as heretofore, and the cleaning and renewing the battery are done with little trouble and expense.

The accompanying figure is a view in perspective.

A represents the glass jar; B and C, respectively, the zinc and copper elements, all constructed and arranged as heretofore. In fact, the battery shown is of a variety in common use at telegraph-offices.

D is a receptacle located next below the zinc elements. The receptacle shown consists of a wooden disk having an upwardly-projecting rim, *d*. Other material that will withstand the action of the acid will answer the purpose; but wood is preferable on account of its cheapness, the cost of such wood receptacle being merely nominal. The receptacle should be large enough to receive the zinc, and should be something less in diameter than the inside of the glass jar, so as not to confine the liquid in the jar. I have suspended the receptacle by means of a piece of insulated wire, E, the latter being passed up through two small holes (not shown) in the bottom of the receptacle, the ends of the wire being twisted together over the zinc. Probably other means of supporting the receptacle would answer the purpose just as well.

In cleaning the battery all that is necessary is to lift out the zinc with the receptacle attached, and empty or remove the zinc oxide from the receptacle and return the parts to their place in the jar, such cleaning requiring only a few moments' time.

My experimental battery, constructed as shown, has been in successful operation continuously for ten weeks without cleaning or renewing. How much longer it will run of course I have no means of judging at present.

What I claim is—

1. The combination, with a gravity electric battery, of a receptacle located next under the zinc element, said receptacle being supported by and connected with the zinc element.

2. The combination, with a gravity electric battery, of a receptacle located so as to catch the zinc oxide from the zinc element, said receptacle being supported by and connected with the zinc element, substantially as set forth.

In testimony whereof I sign this specification, in the presence of two witnesses, this 5th day of March, 1888.

LEON C. BARTLEY.

Witnesses:
C. L. GOULD,
J. S. COWEN.